(12) United States Patent
Dunphy et al.

(10) Patent No.: US 9,329,731 B2
(45) Date of Patent: May 3, 2016

(54) ROUTING TRACE COMPENSATION

(75) Inventors: Jim Dunphy, San Jose, CA (US); Adam Schwartz, Redwood City, CA (US); Joseph Kurth Reynolds, Alviso, CA (US)

(73) Assignee: Synaptics Incorporated, San Jose, CA (US)

( * ) Notice: Subject to any disclaimer, the term of this patent is extended or adjusted under 35 U.S.C. 154(b) by 711 days.

(21) Appl. No.: 13/612,726

(22) Filed: Sep. 12, 2012

(65) Prior Publication Data
US 2014/0070875 A1   Mar. 13, 2014

(51) Int. Cl.
*G06F 3/044* (2006.01)
*G06F 3/041* (2006.01)

(52) U.S. Cl.
CPC .............. *G06F 3/044* (2013.01); *G06F 3/0418* (2013.01); *G06F 2203/04107* (2013.01)

(58) Field of Classification Search
CPC ............ G06F 2203/04107; G06F 2203/04111; G06F 2203/04112; G06F 3/044
See application file for complete search history.

(56) References Cited

U.S. PATENT DOCUMENTS

| | | |
|---|---|---|
| 5,374,787 A | 12/1994 | Miller et al. |
| 5,880,411 A | 3/1999 | Gillespie et al. |
| 5,952,998 A | 9/1999 | Clancy et al. |
| 7,030,860 B1 | 4/2006 | Hsu et al. |
| 7,218,124 B1 | 5/2007 | Mackey et al. |
| 7,358,741 B2 | 4/2008 | Sato et al. |
| 7,735,383 B2 | 6/2010 | Dattalo et al. |
| 7,973,771 B2 | 7/2011 | Geaghan |
| 8,587,533 B2 | 11/2013 | Nishihara |
| 2005/0122119 A1 | 6/2005 | Barlow |
| 2006/0132462 A1 | 6/2006 | Geaghan |
| 2008/0047764 A1 | 2/2008 | Lee et al. |
| 2008/0252608 A1 | 10/2008 | Geaghan |
| 2009/0314105 A1 | 12/2009 | Dattalo et al. |
| 2009/0315570 A1 | 12/2009 | Chappell et al. |
| 2010/0220071 A1* | 9/2010 | Nishihara ............. G06F 3/0416 345/173 |
| 2010/0295814 A1 | 11/2010 | Kent et al. |
| 2011/0062971 A1 | 3/2011 | Badaye |
| 2011/0278078 A1 | 11/2011 | Schediwy et al. |
| 2011/0304566 A1 | 12/2011 | Han |
| 2011/0316803 A1* | 12/2011 | Kim ........................ G06F 3/044 345/173 |
| 2012/0098787 A1 | 4/2012 | Kim et al. |
| 2013/0285971 A1* | 10/2013 | Elias ....................... G06F 3/044 345/174 |

OTHER PUBLICATIONS

"ISA/KR, International Search Report and Written Opinion for International Application # PCT/US2013/054912, pp. 1-10, mailed Nov. 26, 2013".

* cited by examiner

*Primary Examiner* — Kenneth Bukowski

(57) ABSTRACT

A capacitive input device includes first and second pluralities of sensor electrodes disposed in a first region of a substrate. The first and second pluralities of sensor electrodes are substantially orthogonal to one another. The first region is configured to overlap a display screen. At least one routing trace is disposed in a second region of the substrate and is ohmically coupled to a sensor electrode of one of the first and second pluralities of sensor electrodes and also to a processing system. The second region comprises a non-display screen overlapping portion of the substrate. A compensation trace is disposed in the second region and ohmically coupled to the processing system. The compensation trace has substantially the same length as and is substantially parallel and proximate to the at least one routing trace. The compensation trace is not ohmically coupled to any sensor electrode located in the first region.

14 Claims, 10 Drawing Sheets

1000

```
WHEN PERFORMING TRANSCAPACITIVE SENSING WITH A
CAPACITIVE INPUT DEVICE, DRIVE A VOLTAGE ON A
COMPENSATION TRACE
1010
```

↓

```
WHEN PERFORMING ABSOLUTE CAPACITIVE SENSING WITH THE
CAPACITIVE INPUT DEVICE
1020

RECEIVE SIGNALS ON THE COMPENSATION
    TRACE TO MEASURE A CAPACITANCE RELATED
    TO AN INPUT OBJECT IN A SECOND REGION OF
    A SUBSTRATE, WHEREIN THE SUBSTRATE
    COMPRISES A FIRST REGION WHICH OVERLAPS
    A DISPLAY SCREEN AND THE SECOND REGION
    WHICH COMPRISES A NON-DISPLAY SCREEN
    OVERLAPPING PORTION OF THE SUBSTRATE
    1022
                        ↓
    UTILIZE THE RECEIVED SIGNALS FROM THE
    COMPENSATION TRACE TO COMPENSATE FOR
    SENSITIVITY OF THE AT LEAST ONE ROUTING
    TRACE TO THE INPUT OBJECT IN THE SECOND
    REGION
    1024
```

FIG. 10

ROUTING TRACE COMPENSATION

CROSS-REFERENCE TO RELATED UNITED STATES PATENT APPLICATION

This application is related to U.S. Patent Application Publication 2009/0315570A1 (application Ser. No. 12/144,323) filed on Jun. 23, 2008, entitled "CAPACITIVE SENSING DEVICE," by Mark Lynsin et al., and assigned to the assignee of the present application.

BACKGROUND

Capacitive input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones and tablet computers). Such touch screen input devices are typically superimposed upon or otherwise collocated with a display screen of the electronic device.

SUMMARY

In some embodiments, a capacitive input device includes first and second pluralities of sensor electrodes disposed in a first region of a substrate. The first and second pluralities of sensor electrodes are disposed at an angle to one another, such as being substantially orthogonal to one another. The first region is configured to overlap a display screen. At least one routing trace is disposed in a second region of the substrate and is ohmically coupled to a sensor electrode of one of the first and second pluralities of sensor electrodes and also to a processing system. The second region comprises a non-display screen overlapping portion of the substrate. A compensation trace is disposed in the second region and ohmically coupled to the processing system. The compensation trace has substantially the same length as and is substantially parallel and proximate to the at least one routing trace. The compensation trace is not ohmically coupled to any sensor electrode in the first region.

BRIEF DESCRIPTION OF DRAWINGS

The drawings referred to in this Brief Description of Drawings should not be understood as being drawn to scale unless specifically noted. The accompanying drawings, which are incorporated in and form a part of the Description of Embodiments, illustrate various embodiments and, together with the Description of Embodiments, serve to explain principles discussed below, where like designations denote like elements, and:

FIG. 10 illustrates a flow diagram of procedures in an example method of operating a capacitive input device, according to various embodiments.

DESCRIPTION OF EMBODIMENTS

The following Description of Embodiments is merely provided by way of example and not of limitation. Furthermore, there is no intention to be bound by any expressed or implied theory presented in the preceding, background, summary, brief description of drawings, or the following detailed description.

Overview of Discussion

Herein, various embodiments are described that provide input devices, processing systems, and methods that facilitate improved usability. In various embodiments described herein, the input device may be a capacitive input device. Embodiments associated with routing trace compensation, are described herein. The routing traces being compensated are those which are coupled with sensor electrodes of a sensor electrode pattern. Utilizing techniques described herein, an input device/electronic device can compensate for sensitivity to artifacts from inadvertent input objects which couple with one or more routing traces along the edges of the input device/electronic device.

For example, a user often grips an input device/electronic device in a first hand while using a digit from her second hand as an input object on a touch screen of the electronic device. Sometimes digits of the gripping hand wrap around edges of the input device/electronic device and are sensed by routing traces which run along such edges of the electronic device, causing artifacts (stray capacitances that are not intentional user inputs) to be received as inputs in addition to any intentional user inputs.

Discussion begins with a description of an example input device with which or upon which various embodiments described herein may be implemented. An example sensor electrode pattern is then described. This is followed by description of an example processing system and some components thereof. The processing system may be utilized with a capacitive input device that includes a sensor electrode pattern. A variety of routing trace and compensation trace embodiments are presented and discussed as examples. Compensation traces are presented as being similar or identical in construction to routing traces utilized in a capacitive input device, with the exception being that, in some embodiments, compensation traces are not ohmically coupled with any sensor electrode of the capacitive input device or else are not ohmically coupled with any sensor electrodes in a portion of a sensor electrode pattern that overlaps a display of touch/display screen portion of an input device. Operation of the capacitive input device, processing system, and some compensation trace embodiments are then further described in conjunction with description of a method of operating a capacitive input device.

Example Input Device

Figure 1:
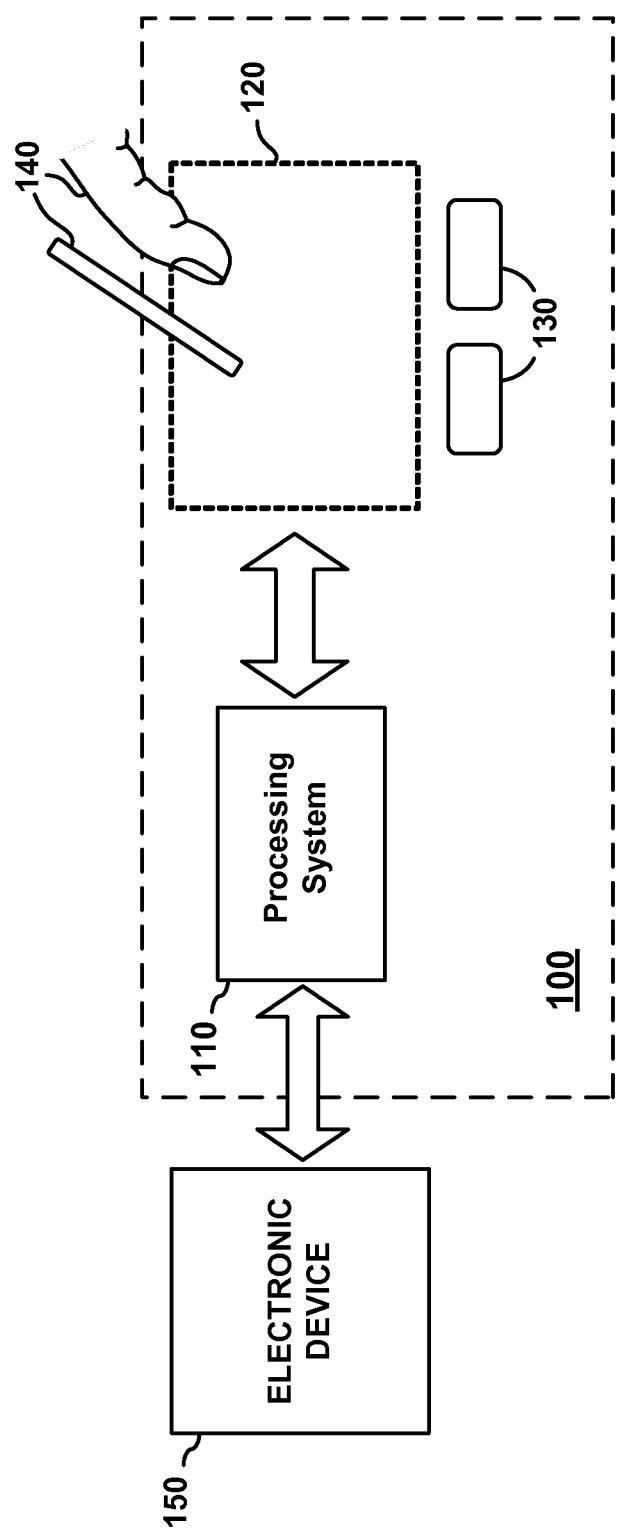
FIG. 1 is a block diagram of an example input device, in accordance with embodiments.

Turning now to the figures, FIG. 1 is a block diagram of an exemplary input device 100, in accordance with various embodiments. Input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

Input device 100 can be implemented as a physical part of the electronic system, or can be physically separate from the electronic system. As appropriate, input device 100 may communicate with parts of the electronic system using any one or more of the following: buses, networks, and other wired or wireless interconnections. Examples include, but are not limited to: Inter-Integrated Circuit (I2C), Serial Peripheral Interface (SPI), Personal System 2 (PS/2), Universal Serial Bus (USB), Bluetooth®, Radio Frequency (RF), and Infrared Data Association (IrDA).

In FIG. 1, input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near input device 100, in which input device 100 is able to detect user input (e.g., user input provided by one or more input objects 140). The sizes, shapes, and locations of particular sensing regions may vary widely from embodiment to embodiment. In some embodiments, sensing region 120 extends from a surface of input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of input device 100, contact with an input surface (e.g., a touch surface) of input device 100, contact with an input surface of input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, sensing region 120 has a rectangular shape when projected onto an input surface of input device 100.

Input device 100 may utilize any combination of sensor components and sensing technologies to detect user input in sensing region 120. Input device 100 comprises one or more sensing elements for detecting user input. As a non-limiting example, input device 100 may use capacitive techniques.

Some implementations are configured to provide images that span one, two, three, or higher dimensional spaces. Some implementations are configured to provide projections of input along particular axes or planes.

In some capacitive implementations of input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Collectively transmitters and receivers may be referred to as sensor electrodes or sensor elements. Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g., other electromagnetic signals). Sensor electrodes may be dedicated transmitters or receivers, or may be configured to both transmit and receive.

In FIG. 1, a processing system 110 is shown as part of input device 100. Processing system 110 is configured to operate the hardware of input device 100 to detect input in sensing region 120. Processing system 110 comprises parts of or all of one or more integrated circuits (ICs) and/or other circuitry components. (For example, a processing system for a mutual capacitance sensor device may comprise transmitter circuitry configured to transmit signals with transmitter sensor electrodes, and/or receiver circuitry configured to receive signals with receiver sensor electrodes). In some embodiments, processing system 110 also comprises electronically-readable instructions, such as firmware code, software code, and/or the like. In some embodiments, components composing processing system 110 are located together, such as near sensing element(s) of input device 100. In other embodiments, components of processing system 110 are physically separate with one or more components close to sensing element(s) of input device 100, and one or more components elsewhere. For example, input device 100 may be a peripheral coupled to a desktop computer, and processing system 110 may comprise software configured to run on a central processing unit of the desktop computer and one or more ICs (perhaps with associated firmware) separate from the central processing unit. As another example, input device 100 may be physically integrated in a phone, and processing system 110 may comprise circuits and firmware that are part of a main processor of the phone. In some embodiments, processing system 110 is dedicated to implementing input device 100. In other embodiments, processing system 110 also performs other functions, such as operating display screens, driving haptic actuators, etc.

Processing system 110 may be implemented as a set of modules that handle different functions of processing system 110. Each module may comprise circuitry that is a part of processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, processing system 110 responds to user input (or lack of user input) in sensing region 120 directly by causing one or more actions. Example actions include changing operation modes, as well as GUI actions such as cursor movement, selection, menu navigation, and other functions. In some embodiments, processing system 110 provides information about the input (or lack of input) to some part of the electronic system (e.g., to a central processing system of the electronic system that is separate from processing system 110, if such a separate central processing system exists). In some embodiments, some part of the electronic system processes information received from processing system 110 to act on user input, such as to facilitate a full range of actions, including mode changing actions and GUI actions.

For example, in some embodiments, processing system 110 operates the sensing element(s) of input device 100 to produce electrical signals indicative of input (or lack of input) in sensing region 120. Processing system 110 may perform any appropriate amount of processing on the electrical signals in producing the information provided to the electronic system. For example, processing system 110 may digitize analog electrical signals obtained from the sensor electrodes. As another example, processing system 110 may perform filtering or other signal conditioning. As yet another example, processing system 110 may subtract or otherwise account for a baseline, such that the information reflects a difference between the electrical signals and the baseline. As yet further examples, processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, input device 100 is implemented with additional input components that are operated by processing system 110 or by some other processing system. These additional input components may provide redundant functionality for input in sensing region 120, or some other functionality. FIG. 1 shows buttons 130 near sensing region 120 that can be used to facilitate selection of items using input device 100. Other types of additional input components include sliders, balls, wheels, switches, and the like. Conversely, in some embodiments, input device 100 may be implemented with no other input components.

In some embodiments, input device 100 may be a touch screen, and sensing region 120 overlaps at least part of an active area of a display screen. For example, input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. Input device 100 and the display screen may share physical elements. For example, some embodiments may utilize some of the same electrical components for displaying and sensing. As another example, the display screen may be operated in part or in total by processing system 110.

It should be understood that while many embodiments are described in the context of a fully functioning apparatus, the mechanisms are capable of being distributed as a program product (e.g., software) in a variety of forms. For example, the mechanisms that are described may be implemented and distributed as a software program on information bearing media that are readable by electronic processors (e.g., non-transitory computer-readable and/or recordable/writable information bearing media readable by processing system 110). Additionally, the embodiments apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other tangible storage technology.

Example Sensor Electrode Pattern

Figure 2:
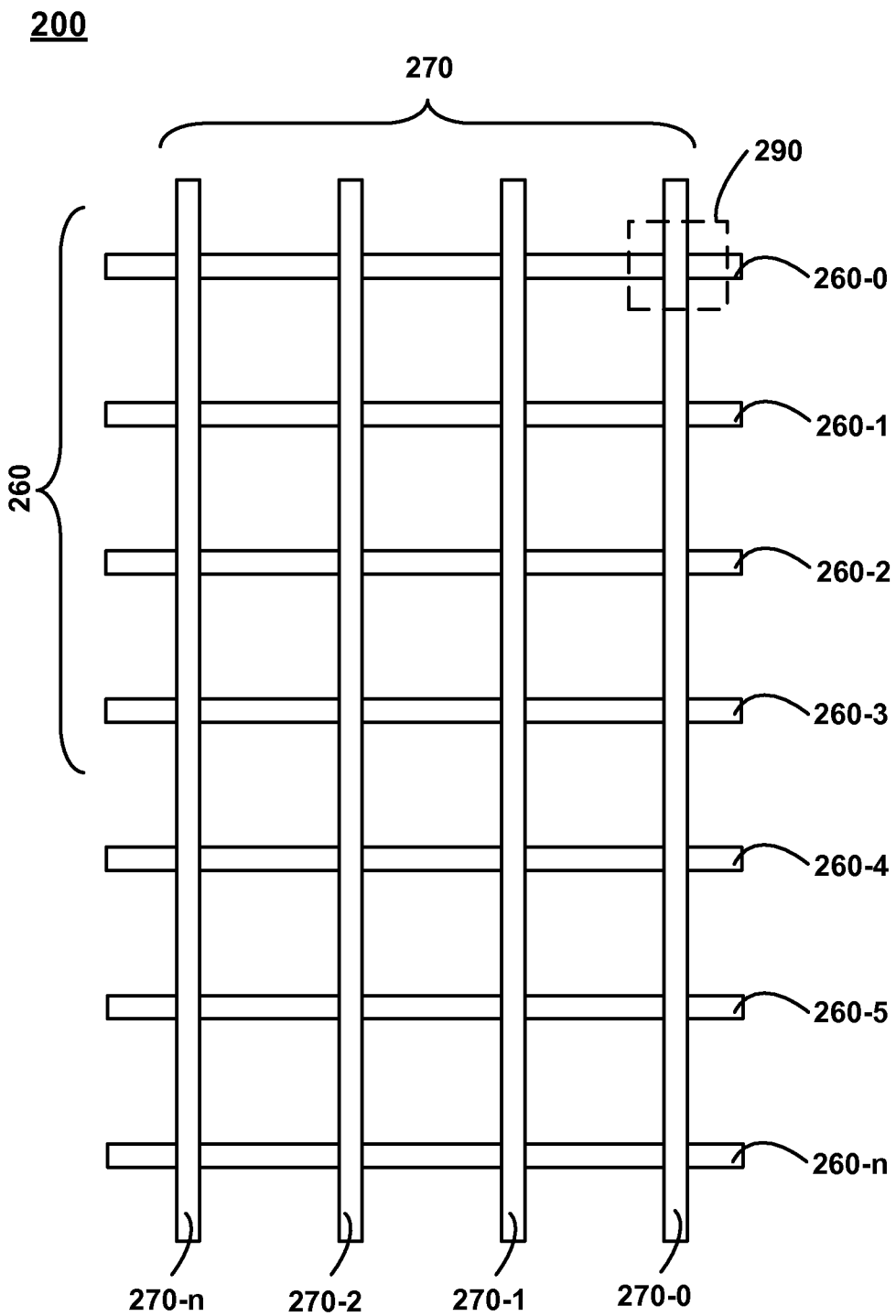
FIG. 2 shows a portion of an example sensor electrode pattern which may be utilized in a sensor to generate all or part of the sensing region of an input device, such as a touch screen, according to some embodiments.

FIG. 2 shows a portion of an example sensor electrode pattern 200 which may be utilized in a sensor to generate all or part of the sensing region of a input device 100, according to various embodiments. Input device 100 is configured as a capacitive input device when utilized with a capacitive sensor electrode pattern. For purposes of clarity of illustration and description, a non-limiting simple rectangular sensor electrode pattern 200 is illustrated. In this rectangular pattern, sensor electrodes cross each other at an angle, which is approximately 90 degrees relative to one another. It is appreciated that other crossing angles are possible and anticipated. Likewise, it is also appreciated that numerous other sensor electrode patterns may be employed.

The illustrated sensor electrode pattern is made up of a first plurality of sensor electrodes 260 (260-0, 260-1, 260-2, 260-3, 260-4, 260-5 . . . 260-$n$) and a second plurality of sensor electrodes 270 (270-0, 270-1, 270-2 . . . 270-$n$) which overlay one another, in this example. It is appreciated that a greater or lesser number of sensor electrodes 260 and/or sensor electrodes 270 may be utilized in other embodiments. In the illustrated example, when sensor electrode pattern 200 is utilized in a transcapacitive sensing mode, touch sensing capacitive pixels are centered at locations where sensor electrodes 260 and sensor electrodes 270 cross. Capacitive pixel 290 illustrates one of the capacitive pixels generated by sensor electrode pattern 200. It is appreciated that in a crossing sensor electrode pattern, such as the illustrated example, some form of insulating material or substrate is typically disposed between sensor electrodes 260 and sensor electrodes 270. However, in some embodiments, sensor electrodes 260 and sensor electrodes 270 may be disposed on the same layer as one another through use of routing techniques and/or jumpers. In various embodiments, touch sensing includes sensing input objects anywhere in sensing region 120 and may comprise: no contact with any surfaces of the input device 100, contact with an input surface (e.g., a touch surface) of the input device 100, contact with an input surface of the input device 100 coupled with some amount of applied force or pressure, and/or a combination thereof.

Capacitive pixels, such as capacitive pixel 290, are areas of localized capacitive coupling between a receiver electrode (e.g. 260-0) and a transmitter electrode (e.g. 270-0). The capacitive coupling between such receiver electrodes and transmitter electrodes changes with the proximity and motion of input objects in the sensing region associated with the pair of receiver electrode and transmitter electrodes.

In some embodiments, sensor electrode pattern 200 is "scanned" to determine these capacitive couplings. That is, the transmitter electrodes (e.g., sensor electrodes 270) are driven to transmit transmitter signals (e.g., modulated voltages). Transmitters may be operated such that one transmitter electrode transmits at one time, or multiple transmitter electrodes transmit at the same time. Where multiple transmitter electrodes transmit simultaneously, these multiple transmitter electrodes may transmit the same transmitter signal and produce an effectively larger transmitter electrode, or these multiple transmitter electrodes may transmit different transmitter signals. For example, multiple transmitter electrodes may transmit different transmitter signals according to one or more coding schemes that enable their combined effects on the resulting signals of receiver electrodes 260 to be independently determined.

Receiver electrodes (e.g., sensor electrodes 260) may be operated singly or in multiples to acquire resulting signals. The resulting signals may be used to determine measurements of the capacitive couplings at the capacitive pixels.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

It is appreciated that sensor electrodes 260 and sensor electrodes 270 may be operated in an absolute sensing mode as well as in the transcapacitive sensing modes described above. In an absolute sensing mode, each sensor electrode (260, 270) is both used for both transmitting and receiving. For example, a sensor electrode is charged by driving by a voltage signal on the sensor electrode and then the absolute capacitance between the sensor electrode and its environment (to include a coupling to any input object in that environment) is measured.

Example Processing System

Figure 3:
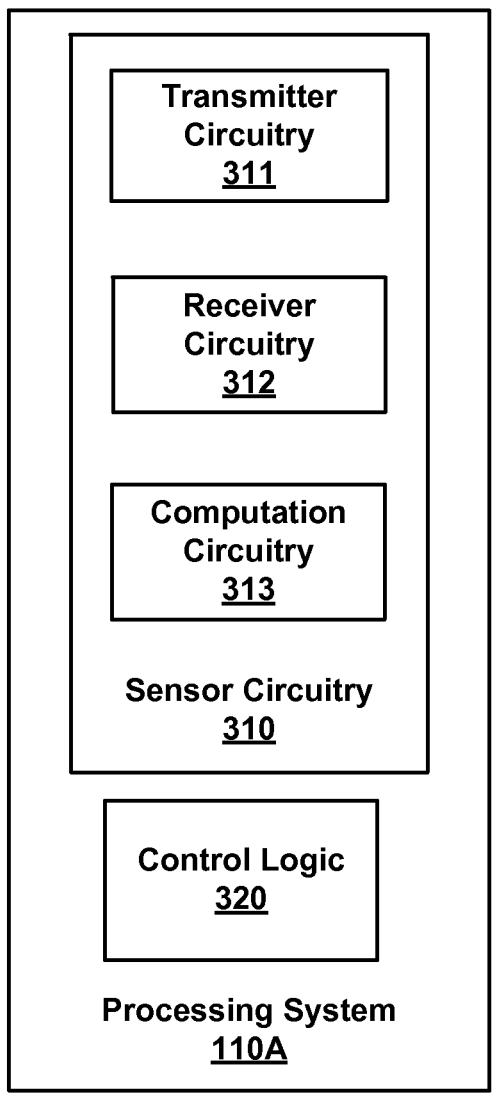
FIG. 3 shows an example processing system which may be utilized with the example input device of FIG. 1, according to various embodiments.

FIG. 3 illustrates a block diagram of some components of an example processing system 110A that may be utilized with an input device (e.g., in place of processing system 110 as part of input device 100), according to various embodiments. Processing system 110A may be implemented with one or more Application Specific Integrated Circuits (ASICSs), one or more Integrated Circuits (ICs), one or more controllers, or some combination thereof. In one embodiment, processing system 110A is communicatively coupled with one or more transmitter electrode(s) and receiver electrode(s) that implement a sensing region 120 of an input device 100. In some embodiments, processing system 110A and the input device 100, of which it is a part, may be disposed in or communicatively coupled with an electronic device 150, such as a display device, computer, or other electronic device.

In one embodiment of input device 100, processing system 110A includes, among other components: sensor circuitry 310, and control logic 320. Processing system 110A and/or components thereof may be coupled with sensor electrodes of a sensor electrode pattern, such as sensor electrode pattern 200. For example, sensor circuitry 310 is coupled with one or more sensor electrodes of a sensor electrode pattern (e.g., sensor electrode pattern 200) of input device 100.

Sensor circuitry 310 operates to interact with receiver and transmitter sensor electrodes of a sensor pattern that is utilized to generate a sensing region 120. This includes operating transmitter electrodes to be silent or transmit a transmitter signal when a capacitive input device is operated in a transcapacitive mode. This also includes utilizing receiver sensor electrodes, in a transcapacitive mode, to receive resulting signals that result from the transmissions from the transmitter electrodes. In a transcapacitive mode, sensor circuitry 310 may also determine from received resulting signal(s) that an input has occurred in sensing region 120, as well as determining a location of the input with respect to sensing region 120. Sensor circuitry 310 may further operate sensor electrodes (260, 270) in an absolute capacitive sensing mode in which a signal is modulated on a sensor electrode and then capacitance changes introduced by an input object are measured to determine the presence of an input object.

Sensor circuitry 310 also operates to transmit/drive a voltage and/or signals on, maintain a particular electrical potential on, and/or receive signals from one or more compensation traces which are included in a capacitive input device. For example, a compensation trace on a substrate may be maintained at virtual ground potential or any potential and utilized as a shield when a sensor electrode pattern is being operated in transcapacitive sensing mode; and when the sensor electrode pattern is operated in an absolute capacitive sensing mode, the same compensation trace may be operated in a manner as if it were connected to a sensor electrode of a sensor electrode pattern.

As depicted in FIG. 3, sensor circuitry 310 may include one or more of transmitter circuitry 311, receiver circuitry 312, and computation circuitry 313.

Transmitter circuitry 311 operates to transmit transmitter signals on one or more sensor electrodes. In a transcapacitive sensing mode, transmitter circuitry 311 transmits transmitter signals on transmitter electrodes. In an absolute capacitive sensing mode, transmitter circuitry 311 may transmit a signal on any sensor electrode (260, 270) of a sensor electrode pattern and/or maintain any sensor electrode at a selected electrical potential.

In a given time interval, transmitter circuitry 311 may transmit or not transmit a transmitter signal (waveform) on one or more of a plurality of sensor electrodes. Transmitter circuitry 311 may also be utilized to couple one or more sensor electrodes of a plurality of sensor electrodes to high impedance, ground, or to a constant voltage when not transmitting a waveform on such sensor electrodes. Transmitter circuitry also operates similarly with respect to a compensation trace. The transmitter signal may be a square wave, trapezoidal wave, or some other waveform. Transmitter circuitry 311 may code a transmitter signal, such as in a code division multiplexing scheme. The code may be altered, such as lengthening or shortening the code, under direction of control logic 320. Lengthening the code is one technique for avoiding interference.

Receiver circuitry 312 operates in a transcapacitive sensing mode to receive resulting signals via one or more sensor electrodes which are not being transmitted upon. In a transcapacitive sensing mode received resulting signals correspond to and include some version of the transmitter signal(s) transmitted via the transmitter electrodes. These transmitted transmitter signals however, may be altered or changed in the resulting signal due to stray capacitance, noise, interference, and/or circuit imperfections among other factors, and thus may differ slightly or greatly from their transmitted versions. To avoid interference, receiver circuitry 312 may be equipped to implement one or more filtering operations, which may include utilizing either or both of linear and non-linear filtering techniques. Resulting signals may be received on one or a plurality of receiver electrodes during a time interval. Receiver circuitry 312 includes a plurality of amplifiers, typically one per receiver electrode. Such amplifiers may be referred to herein as amplifiers, front-end amplifiers, integrating amplifiers, or the like, and receive a reference voltage at a first input and a resulting signal at a second input. The resulting signal is from a receiver electrode of a capacitive sensor device.

Receiver circuitry 312 operates in an absolute sensing mode to receive signals representative of an absolute capacitance measured on a sensor electrode and/or on a compensation trace.

Computation circuitry 313 operates to compute/determine a measurement of a change in a capacitive coupling between a transmitter electrode and a receiver electrode in a transcapacitive sensing mode; to compute/determine a measurement of change in capacitive coupling to a sensor electrode in an absolute capacitance sensing mode; and to measure a capacitance on a compensation trace when operating in an absolute sensing mode. Computation circuitry then uses these measurements of capacitance to determine the position of an input object (if any) with respect to sensing region 120. In an absolute sensing mode, computation circuitry 313 uses a capacitance measured on a compensation trace to compensate for routing trace sensitivity to capacitive artifacts which may have been introduced by inadvertent input objects capacitively coupling with routing traces on along a side edge of a capacitive sensing pattern which is outside of sensing region 120. Such compensation can include subtracting the compensation trace capacitance value (or a scaled compensation trace capacitance value) from a capacitance measured from a sensor electrode which has a routing trace proximate to the compensation trace. Similar compensation can occur for capacitances measured on multiple sensor electrodes which have routing traces running proximate the compensation trace, where proximate means along the same side edge of a sensing region.

Scaling may be based on a distance between a compensation trace/traces and a particular proximate routing trace, and may be linear or non-linear. Scaling may additionally or alternatively be based upon a ratio between surface area of a routing trace and a compensation trace. In both cases, the scaling is roughly based on these relationships, but is adjusted, in some embodiments, in order to maximize compensation for "grip artifacts" from gripping digits which couple to the routing traces. In one embodiment, for example, approximately half of the capacitance measured on a compensation trace may be subtracted from one or more proximate routing traces when the compensation trace is similar/identical in length to the routing trace(s), but approximately double in width. It should be appreciated that this example is an approximation of how much capacitance would be subtracted, as in real-world operation capacitance measurements may not scale exactly with area for a variety of reasons including variances in measuring circuitry and/or variances in manufacturing.

Control logic 320 comprises decision making logic which directs processing system 110A and sensor circuitry 310 to operate in a selected one of a plurality of different operating modes. In one embodiment, for example, control logic 320 may operate sensor electrodes of a sensor electrode pattern in a transcapacitive sensing mode or an absolute capacitive sensing mode. Some non-limiting examples of such inputs include one or more measurement(s) of interference and/or indication of an input being sensed or not sensed in sensing region 120 of input device 100. Control logic may be implemented as hardware (e.g., hardware logic and/or other circuitry) and/or as a combination of hardware and instructions stored in a non-transitory manner in a computer readable storage medium.

Example Routing Trace and Compensation Trace Configurations

Figure 4:
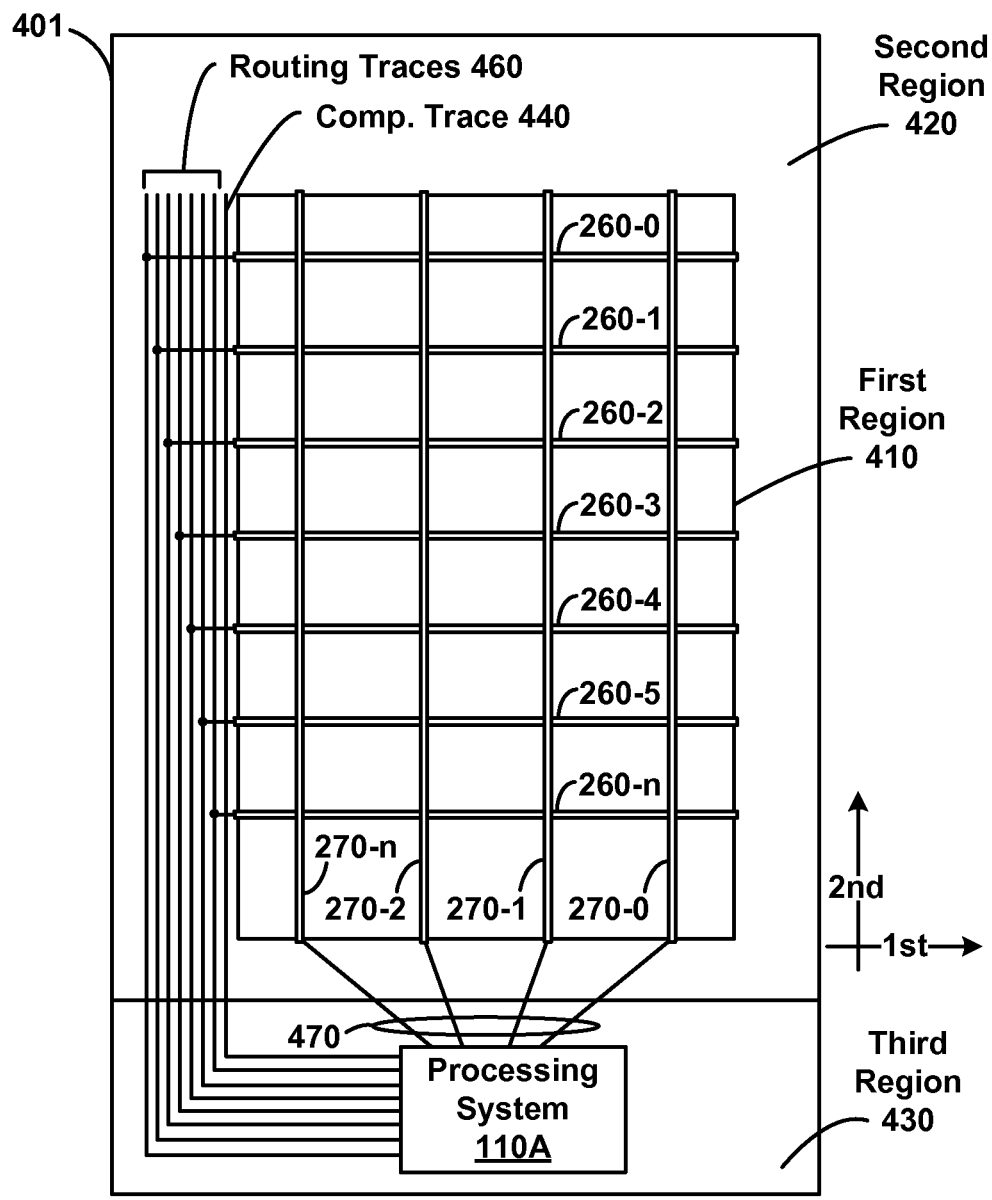
FIG. 4 illustrates a capacitive input device which includes a sensor electrode pattern, routing traces, and a compensation trace, according to various embodiments.

FIG. 4 illustrates a capacitive input device 400 which includes a sensor electrode pattern, routing traces, and a compensation trace, according to various embodiments. With reference to FIG. 4, the sensor electrode pattern is similar to sensor electrode pattern 200 of FIG. 2 and includes a first plurality of sensor electrodes 260 disposed parallel to a first direction and a second plurality of sensor electrodes 270 disposed parallel to a second direction. As depicted, the angle between the first and second directions, and consequently between the first plurality of sensor electrodes 260 and the second plurality of sensor electrodes 270, is substantially (e.g., within manufacturing tolerances) orthogonal. It is appreciated, however, other angles between the first and second set of sensor electrodes (260, 270), which are greater than zero degrees and less than 180 degrees, may exist in other embodiments.

The first and second pluralities of sensor electrodes (260, 270) are disposed in a first region 410 of substrate 401 which is configured to overlap a display screen of capacitive input device 400. First region 410 is depicted as having a rectangular shape which bounds the first region with a top, bottom, left, and right side edges. Substrate 401 also includes a second region 420, and in some embodiments, a third region 430. Second region 420 is a portion of substrate 401 which does not overlap a display screen of capacitive input device 400. Third region 430, when included, is a portion of substrate 401 which a) does not overlap a display screen of capacitive input device 400; and b) provides a bonding region for an ASIC and/or integrated circuits, such as processing system 110A. Third region 430, when included, typically also includes shielding to shield processing system 110A and routing traces which are disposed in the third region. Third region 430, when included, typically also includes shielding to shield processing system 110A and routing traces which are disposed in the third region. In an embodiment where third region 430 is not included, processing system 110A is not mounted on substrate 401, and is instead mounted elsewhere on another substrate and then electrically coupled with routing and compensation traces depicted in second region 420. In one embodiment, substrate 401 is made of glass.

Routing traces 470 are disposed in second region 420, along a bottom side edge of first region 410, and ohmically couple individual sensor electrodes 270 (270-0 . . . 270-n) with processing system 110A.

Routing traces 460 are disposed in second region 420, along a left side edge of first region 410, and ohmically couple individual sensor electrodes 260 (260-0 . . . 260-n) with processing system 110A.

A compensation trace 440 is disposed in second region 420 and ohmically coupled to processing system 110A. In some embodiments, compensation trace 440 is not ohmically coupled to any sensor electrode. In other embodiments, compensation trace 440 is not ohmically coupled to any sensor electrode that is located in first region 410, but may be ohmically coupled to a sensor electrode that is not located in first region 410 (e.g., compensation trace 440 may be coupled to a sensor electrode located entirely in second region 420). Compensation trace 440 is substantially parallel and proximate to routing traces 460 and has substantially the same overall length (and the same length along the left side edge of first region 410) as the individual routing traces of routing traces 460. In this manner, an inadvertent input object, such as the tip of the finger of a hand gripping capacitive input device 400, should capacitively couple to routing traces 460 and compensation trace 440 in a similar or predictable manner.

In the embodiment depicted in FIG. 4, compensation trace 440 is disposed between the sensor electrodes (260, 270) of first region 410 and routing traces 460. Because of this, each routing trace 460 crosses compensation trace 440, without being ohmically coupled to compensation trace 440 (such as by jumpering over), in order to reach and ohmically couple with a sensor electrode 260.

In one embodiment, sensor electrodes 260 of FIG. 4 are configured to be utilized as transmitter electrodes while sensor electrodes 270 of FIG. 4 are configured to be utilized as receiver electrodes. In another embodiment, sensor electrodes 260 of FIG. 4 are configured to be utilized as receiver electrodes while sensor electrodes 270 of FIG. 4 are configured to be utilized as transmitter electrodes. In either of these embodiments, compensation trace 440 may be held at a fixed potential (including ground potential) or maintained at a high impedance when capacitive input device 400 is operated in a transcapacitive sensing mode, and used for capacitive compensation when capacitive input device 400 is operated in an absolute capacitive sensing mode.

When being used for capacitive compensation, the measured capacitance from compensation trace 440 can be utilized in various manners to compensate for sensitivity of one or more routing traces. For example, the capacitance measured from compensation trace 440 may be subtracted or scaled and then subtracted from one or more of the capacitances measured by one or more sensor electrodes coupled with routing traces 460 which are parallel and proximate to compensation trace 440. In some embodiments, the scaling may be the same for each of routing traces 460, while in other embodiments, a different scaling factor may be applied depending on which routing trace of routing traces 460 is being compensated.

Figure 5:
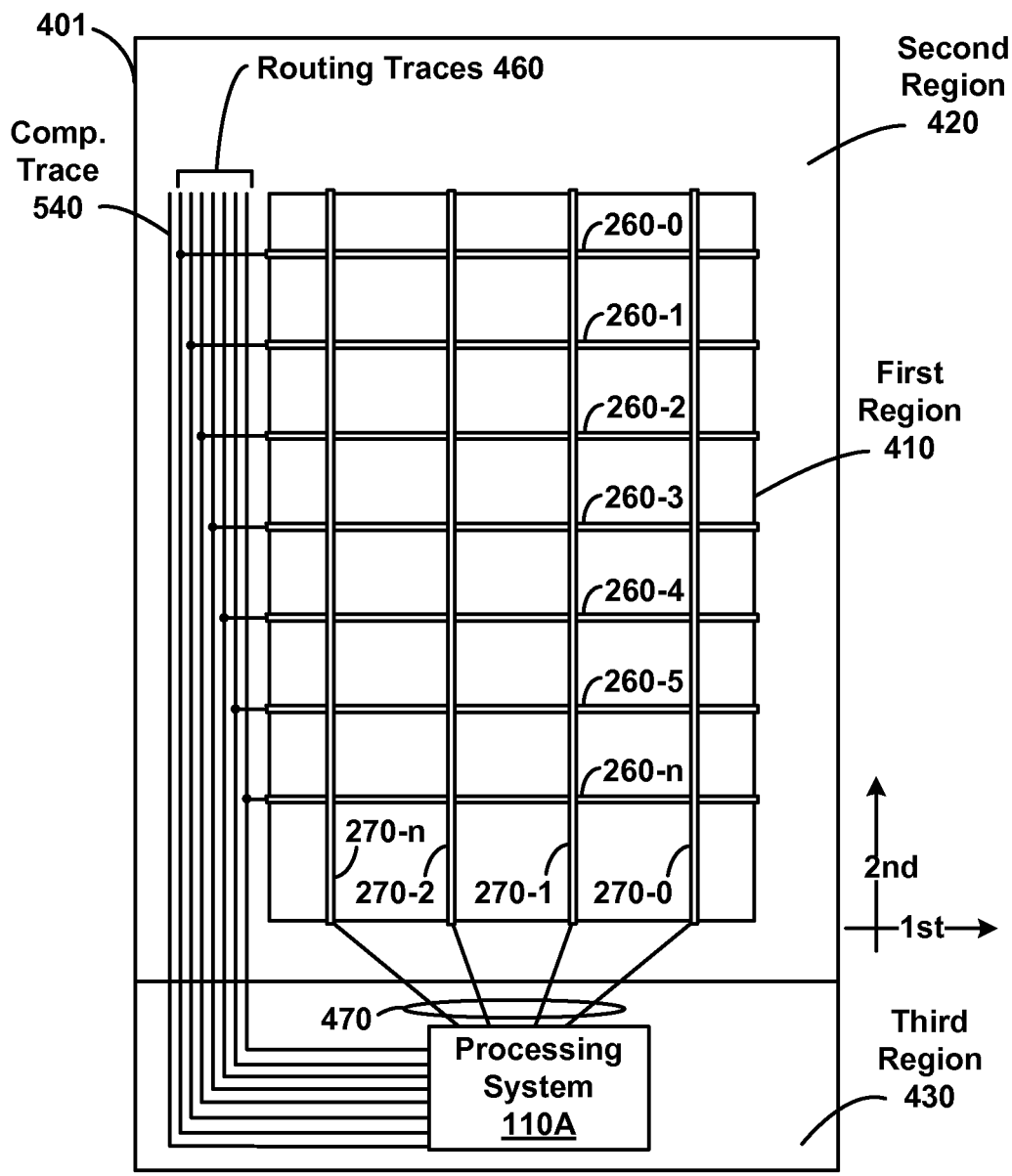
FIG. 5 illustrates a capacitive input device which includes a sensor electrode pattern, routing traces, and a compensation trace, according to various embodiments.

FIG. 5 illustrates a capacitive input device 500 which includes a sensor electrode pattern, routing traces, and a compensation trace, according to various embodiments. With reference to FIG. 5, the sensor electrode pattern is similar to sensor electrode pattern 200 of FIG. 2 and includes a first plurality of sensor electrodes 260 disposed parallel to a first direction and a second plurality of sensor electrodes 270 disposed parallel to a second direction. As depicted, the angle between the first and second directions, and consequently between the first plurality of sensor electrodes 260 and the second plurality of sensor electrodes 270, is substantially (e.g., within manufacturing tolerances) orthogonal. It is appreciated, however, other angles between the first and second set of sensor electrodes (260, 270), which are greater than zero degrees and less than 180 degrees, may exist in other embodiments.

In FIG. 5, as in FIG. 4, the first and second pluralities of sensor electrodes (260, 270) are disposed in a first region 410 of substrate 401 which is configured to overlap a display screen of capacitive input device 500. First region 410 is depicted as having a rectangular shape which bounds the first region with a top, bottom, left, and right side edges. Substrate 401 also includes a second region 420, and in some embodiments, a third region 430. Second region 420 is a portion of substrate 401 which does not overlap a display screen of capacitive input device 500. Third region 430, when included, is a portion of substrate 401 which a) does not overlap a display screen of capacitive input device 500; and b) provides a bonding region for an ASIC and/or integrated circuits, such as processing system 110A. Third region 430, when included, typically also includes shielding to shield processing system 110A and routing traces which are disposed in the third region. In an embodiment where third region 430 is not included, processing system 110A is not mounted on substrate 401, and is instead mounted elsewhere on another substrate and then electrically coupled with routing and compensation traces depicted in second region 420. In one embodiment, substrate 401 is made of glass.

Routing traces 470 are disposed in second region 420, along a bottom side edge of first region 410, and ohmically couple individual sensor electrodes 270 (270-0 . . . 270-n) with processing system 110A.

Routing traces 460 are disposed in second region 420, along a left side edge of first region 410, and ohmically couple individual sensor electrodes 260 (260-0 . . . 260-n) with processing system 110A.

A compensation trace 540 is disposed in second region 420 and ohmically coupled to processing system 110A. In some embodiments, compensation trace 540 is not ohmically coupled to any sensor electrode. In other embodiments, compensation trace 540 is not ohmically coupled to any sensor electrode that is located in first region 410, but may be ohmically coupled to a sensor electrode that is not located in first region 410 (e.g., compensation trace 540 may be coupled to a sensor electrode located entirely in second region 420). Compensation trace 540 is substantially parallel and proximate to routing traces 460 and has substantially the same overall length (and the same length along the left side edge of first region 410) as the individual routing traces of routing traces 460. In this manner, an inadvertent input object, such as the tip of the finger of a hand gripping capacitive input device 500, should capacitively couple to routing traces 460 and compensation trace 540 in a similar or predictable manner.

In the embodiment depicted in FIG. 5, routing traces 460 are disposed between the sensor electrodes (260, 270) of first region 410 and compensation trace 540. Because of this, routing traces 460 do not cross compensation trace 540 in order to reach and ohmically couple with a sensor electrode 260.

In one embodiment, sensor electrodes 260 of FIG. 5 are configured to be utilized as transmitter electrodes while sensor electrodes 270 of FIG. 5 are configured to be utilized as receiver electrodes. In another embodiment, sensor electrodes 260 of FIG. 5 are configured to be utilized as receiver electrodes while sensor electrodes 270 of FIG. 5 are configured to be utilized as transmitter electrodes. In either of these embodiments, compensation trace 540 may be held at a fixed potential (including ground potential) or maintained at a high impedance when capacitive input device 500 is operated in a transcapacitive sensing mode, and used for capacitive compensation when capacitive input device 500 is operated in an absolute capacitive sensing mode.

When being used for capacitive compensation, the measured capacitance from compensation trace 540 can be utilized in various manners to compensate for sensitivity of one or more routing traces. For example, the capacitance measured from compensation trace 540 may be subtracted or scaled and then subtracted from one or more of the capacitances measured by one or more sensor electrodes coupled with routing traces 460 which are parallel and proximate to compensation trace 540. In some embodiments, the scaling may be the same for each of routing traces 460, while in other embodiments, a different scaling factor may be applied depending on which routing trace of routing traces 460 is being compensated.

Figure 6:
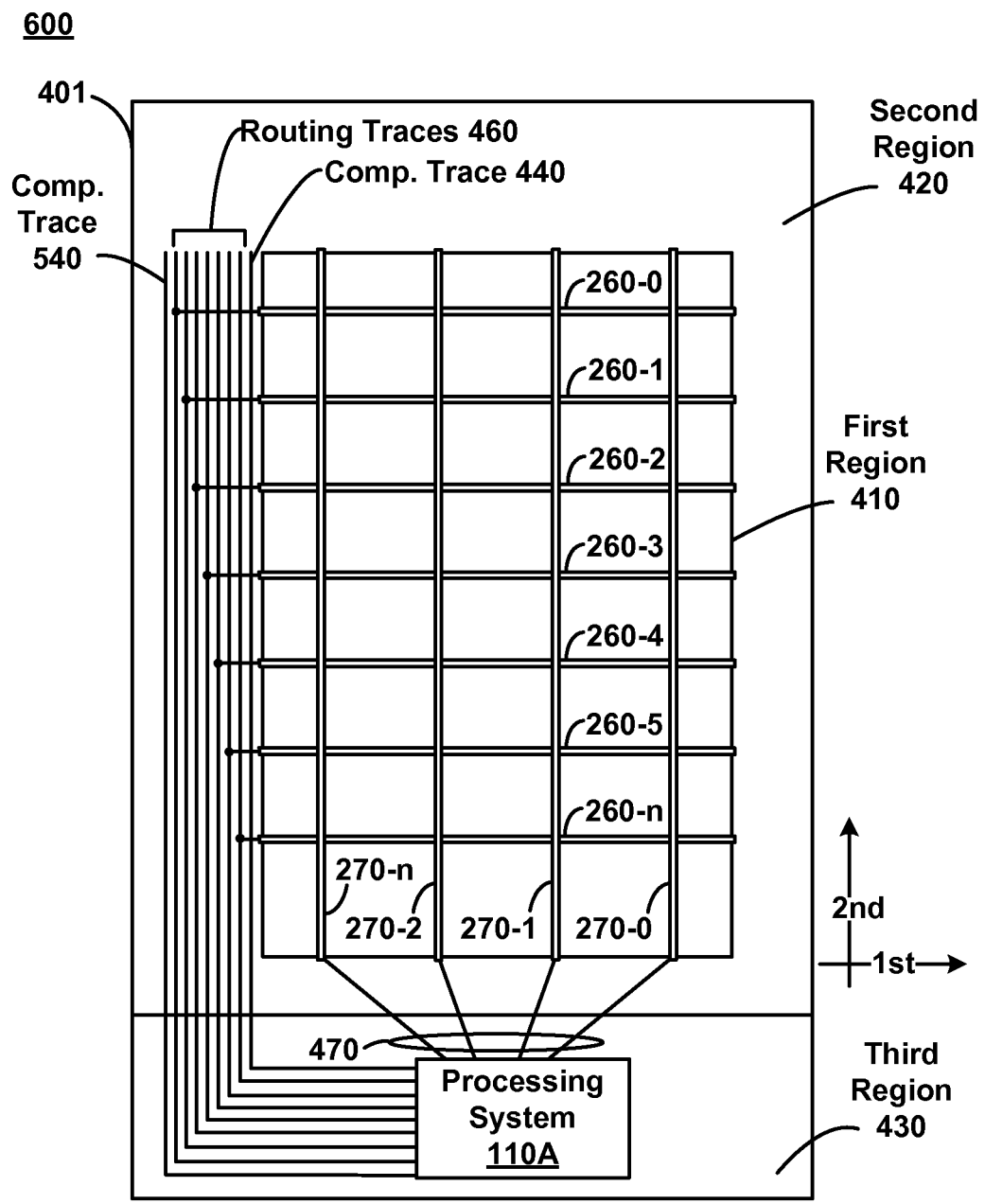
FIG. 6 illustrates a capacitive input device which includes a sensor electrode pattern, routing traces, and a plurality of compensation traces, according to various embodiments.

FIG. 6 illustrates a capacitive input device 600 which includes a sensor electrode pattern, routing traces, and a plurality of compensation traces, according to various embodiments. FIG. 6 is similar to FIGS. 4 and 5 and includes both compensation trace 440 and compensation trace 540. With reference to FIG. 6, the sensor electrode pattern is similar to sensor electrode pattern 200 of FIG. 2 and includes a first plurality of sensor electrodes 260 disposed parallel to a first direction and a second plurality of sensor electrodes 270 disposed parallel to a second direction. As depicted, the angle between the first and second directions, and consequently between the first plurality of sensor electrodes 260 and the second plurality of sensor electrodes 270, is substantially (e.g., within manufacturing tolerances) orthogonal. It is appreciated, however, other angles between the first and second set of sensor electrodes (260, 270), which are greater than zero degrees and less than 180 degrees, may exist in other embodiments.

In FIG. 6, as in FIGS. 4 and 5, the first and second pluralities of sensor electrodes (260, 270) are disposed in a first region 410 of substrate 401 which is configured to overlap a display screen of capacitive input device 600. First region 410 is depicted as having a rectangular shape which bounds the first region with a top, bottom, left, and right side edges. Substrate 401 also includes a second region 420, and in some embodiments, a third region 430. Second region 420 is a portion of substrate 401 which does not overlap a display screen of capacitive input device 600. Third region 430, when included, is a portion of substrate 401 which a) does not overlap a display screen of capacitive input device 600; and b) provides a bonding region for an ASIC and/or integrated circuits, such as processing system 110A. Third region 430, when included, typically also includes shielding to shield processing system 110A and routing traces which are disposed in the third region. In an embodiment where third region 430 is not included, processing system 110A is not mounted on substrate 401, and is instead mounted elsewhere on another substrate and then electrically coupled with routing and compensation traces depicted in second region 420. In one embodiment, substrate 401 is made of glass.

Routing traces 470 are disposed in second region 420, along a bottom side edge of first region 410, and ohmically couple individual sensor electrodes 270 (270-0 . . . 270-n) with processing system 110A.

Routing traces 460 are disposed in second region 420, along a left side edge of first region 410, and ohmically couple individual sensor electrodes 260 (260-0 . . . 260-n) with processing system 110A.

Compensation traces 450 and 540 are disposed in second region 420 and ohmically coupled to processing system 110A, but are not ohmically coupled to one another. In some embodiments, compensation traces 440 and/or 540 are not ohmically coupled to any sensor electrode. In other embodiments, compensation traces 440 and/or 540 are not ohmically coupled to any sensor electrode in first region 410, but either or both may be ohmically coupled to respective sensor electrodes that are not located in first region 410. Compensation traces 440 and 540 are substantially parallel and proximate to routing traces 460 and have substantially the same overall length (and the same length along the left side edge of first region 410) as the individual routing traces of routing traces 460. In this manner, an inadvertent input object, such as the tip of the finger of a hand gripping capacitive input device 600, should capacitively couple to routing traces 460 and compensation traces 440 and 540 in a similar or predictable manner.

In an embodiment, such as that depicted in FIG. 6, where two compensation traces, such as 440 and 540, sandwich a plurality of routing traces, such as routing traces 460, various techniques can be employed to compensate for sensitivity of one or more of routing traces to an input object in second region 420. For example, in one embodiment, a first capacitance measured on compensation trace 440 can be averaged with a second capacitance measured on compensation trace 540. This averaged capacitance can then be subtracted from each of the capacitances measured by a sensor electrode coupled with one of routing traces 460. In another embodiment, the amount of a first capacitance measured on compensation trace 440 and the amount of a second capacitance measured on compensation trace 540 can be each scaled or weighted in a different but specific combination for each of the routing traces of routing traces 460. The specified combination of the first and second capacitances associated with a particular routing trace of routing traces 460 can then be subtracted from a capacitance measured by a sensor electrode coupled with the particular routing trace of routing traces 460. The scaling factors used for scaling each of the first and second capacitances can be determined in a number of ways, such as: empirically based on measuring the effects of grounds placed near the routing traces; based on modeling of the effects of grounds placed near the routing traces 460;

and/or based on the distance of a routing trace from each of compensation traces 440 and 540. The scaling for how a capacitance measured on either of compensation trace 440 or 540 may be equal for each routing trace 460, or may change a linear or non-linear fashion based on the distance of the routing trace from a particular compensation trace. In one embodiment, computation circuitry 313 accomplishes such scaling and compensation.

In one embodiment, sensor electrodes 260 of FIG. 6 are configured to be utilized as transmitter electrodes while sensor electrodes 270 of FIG. 6 are configured to be utilized as receiver electrodes. In another embodiment, sensor electrodes 260 of FIG. 6 are configured to be utilized as receiver electrodes while sensor electrodes 270 of FIG. 6 are configured to be utilized as transmitter electrodes. In either of these embodiments, compensation traces 440 and/or 540 may be held at a fixed potential (including ground potential) or maintained at a high impedance when capacitive input device 600 is operated in a transcapacitive sensing mode, and used for capacitive compensation when capacitive input device 600 is operated in an absolute capacitive sensing mode.

Figure 7:
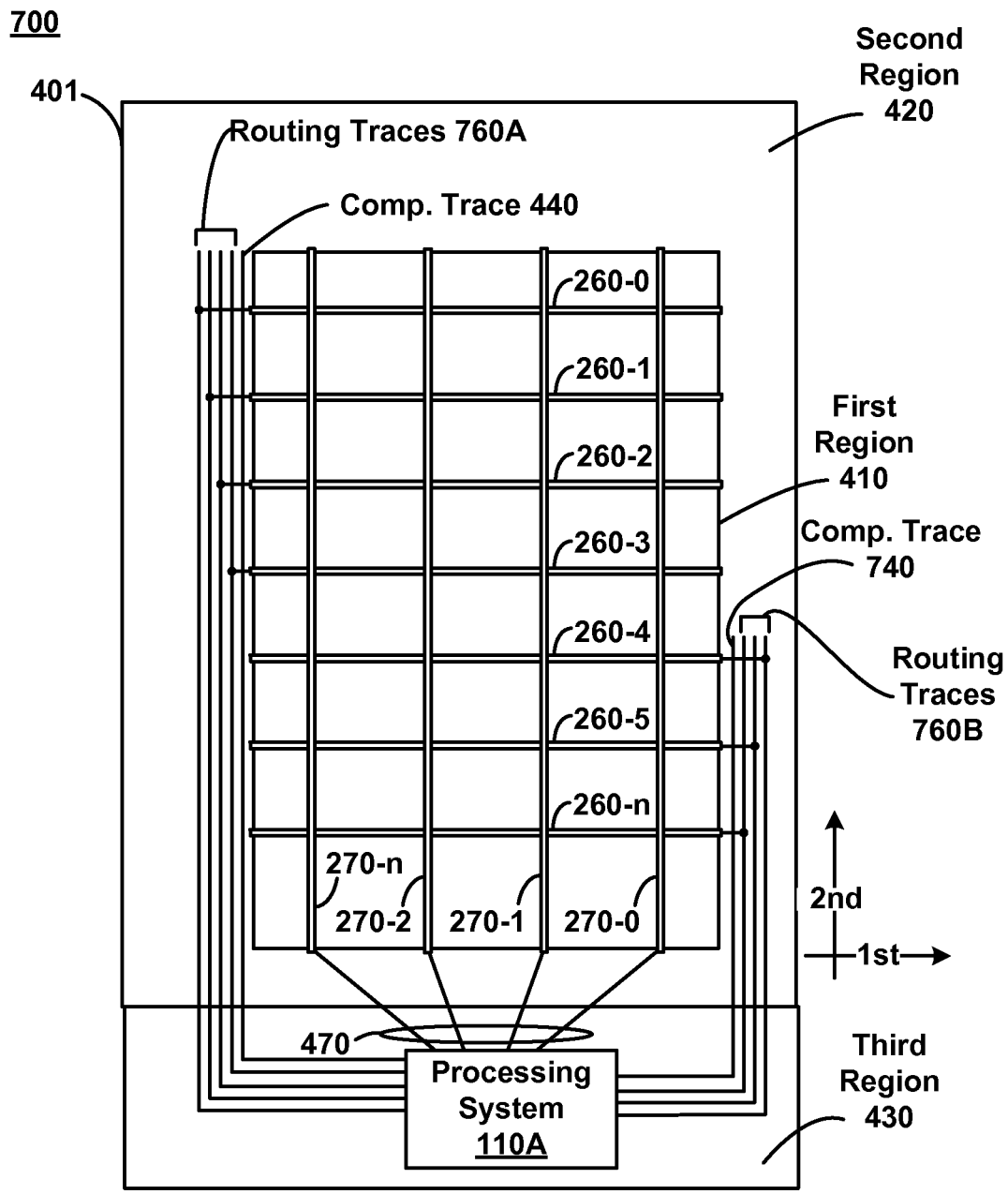
FIG. 7 illustrates a capacitive input device which includes a sensor electrode pattern, routing traces, and a plurality of compensation traces, according to various embodiments.

FIG. 7 illustrates a capacitive input device 700 which includes a sensor electrode pattern, routing traces, and a plurality of compensation traces, according to various embodiments. With reference to FIG. 7, the sensor electrode pattern is similar to sensor electrode pattern 200 of FIG. 2 and includes a first plurality of sensor electrodes 260 disposed parallel to a first direction and a second plurality of sensor electrodes 270 disposed parallel to a second direction. As depicted, the angle between the first and second directions, and consequently between the first plurality of sensor electrodes 260 and the second plurality of sensor electrodes 270, is substantially (e.g., within manufacturing tolerances) orthogonal. It is appreciated, however, other angles between the first and second set of sensor electrodes (260, 270), which are greater than zero degrees and less than 180 degrees, may exist in other embodiments.

In FIG. 7, as in FIGS. 4, 5, and 6, the first and second pluralities of sensor electrodes (260, 270) are disposed in a first region 410 of substrate 401 which is configured to overlap a display screen of capacitive input device 700. First region 410 is depicted as having a rectangular shape which bounds the first region with a top, bottom, left, and right side edges. Substrate 401 also includes a second region 420, and in some embodiments, a third region 430. Second region 420 is a portion of substrate 401 which does not overlap a display screen of capacitive input device 700. Third region 430, when included, is a portion of substrate 401 which a) does not overlap a display screen of capacitive input device 700; and b) provides a bonding region for an ASIC and/or integrated circuits, such as processing system 110A. Third region 430, when included, typically also includes shielding to shield processing system 110A and routing traces which are disposed in the third region. In an embodiment where third region 430 is not included, processing system 110A is not mounted on substrate 401, and is instead mounted elsewhere on another substrate and then electrically coupled with routing and compensation traces depicted in second region 420. In one embodiment, substrate 401 is made of glass.

Routing traces 470 are disposed in second region 420, along a bottom side edge of first region 410, and ohmically couple individual sensor electrodes 270 (270-0 ... 270-n) with processing system 110A.

Routing traces 760A are disposed in second region 420, along a left side edge of first region 410, and ohmically couple individual sensor electrodes 260-0, 260-1, 260-2, and 260-3 of sensor electrodes 260 with processing system 110A.

Routing traces 760B are disposed in second region 420, along a portion of the right side edge of first region 410, and ohmically couple individual sensor electrodes 260-4, 260-5, 260-6 of sensor electrodes 260 with processing system 110A.

A compensation trace 440 is disposed in second region 420 and ohmically coupled to processing system 110A. In some embodiments, compensation trace 440 is not ohmically coupled to any sensor electrode. In some embodiments, compensation trace 440 is not ohmically coupled to any sensor electrode that is located in first region 410, but may be ohmically coupled to a sensor electrode that is not located in first region 410. Compensation trace 440 is substantially parallel and proximate to routing traces 760A and has substantially the same overall length (and the same length along the left side edge of first region 410) as the individual routing traces of routing traces 760A. In this manner, an inadvertent input object, such as the tip of the finger of a hand gripping capacitive input device 700, should capacitively couple to routing traces 760A and compensation trace 440 in a similar or predictable manner.

In the embodiment depicted in FIG. 7, compensation trace 440 is disposed between the sensor electrodes (260, 270) of first region 410 and routing traces 760A. Because of this, each routing trace of routing traces 760A crosses compensation trace 440, without being ohmically coupled to compensation trace 440 (such as by jumpering over), in order to reach and ohmically couple with a sensor electrode 260.

A compensation trace 740 is disposed in second region 420 and ohmically coupled to processing system 110A. In some embodiments, compensation trace 740 is not ohmically coupled to any sensor electrode. In some embodiments, compensation trace 740 is not coupled to any sensor electrode in first region 410, but may be ohmically coupled to a sensor electrode that is not located in first region 410. Compensation traces 440 and 740 are each disposed proximate to routing traces that are disposed along different side edges of first region 410. For example, compensation trace 740 is substantially parallel and proximate to routing traces 760B and has substantially the same overall length (and the same length along the right side edge of first region 410) as the individual routing traces of routing traces 760B. In this manner, an inadvertent input object, such as the tip of the finger of a hand gripping capacitive input device 700, should capacitively couple to routing traces 760B and compensation trace 740 in a manner or predictable manner.

In the embodiment depicted in FIG. 7, compensation trace 740 is disposed between the sensor electrodes (260, 270) of first region 410 and routing traces 760B. Because of this, each routing trace of routing traces 760B crosses compensation trace 740, without being ohmically coupled to compensation trace 740 (such as by jumpering over), in order to reach and ohmically couple with a sensor electrode 260.

In the embodiment illustrated in FIG. 7, when in an absolute sensing mode, capacitances measured on compensation trace 440 are employed to compensate for sensitivity to input objects experienced by routing traces 760A; while capacitances measured on compensation trace 740 are employed to compensate for sensitivity to input objects experienced by routing traces 760B. Such compensation can be performed in the manners previously described herein.

In one embodiment, sensor electrodes 260 of FIG. 7 are configured to be utilized as transmitter electrodes while sensor electrodes 270 of FIG. 7 are configured to be utilized as receiver electrodes. In another embodiment, sensor electrodes 260 of FIG. 7 are configured to be utilized as receiver electrodes while sensor electrodes 270 of FIG. 7 are configured to be utilized as transmitter electrodes. In either of these embodiments, compensation traces 440 and/or 740 may be held at a fixed potential (including ground potential) or maintained at a high impedance when capacitive input device 700 is operated in a transcapacitive sensing mode.

Figure 8:
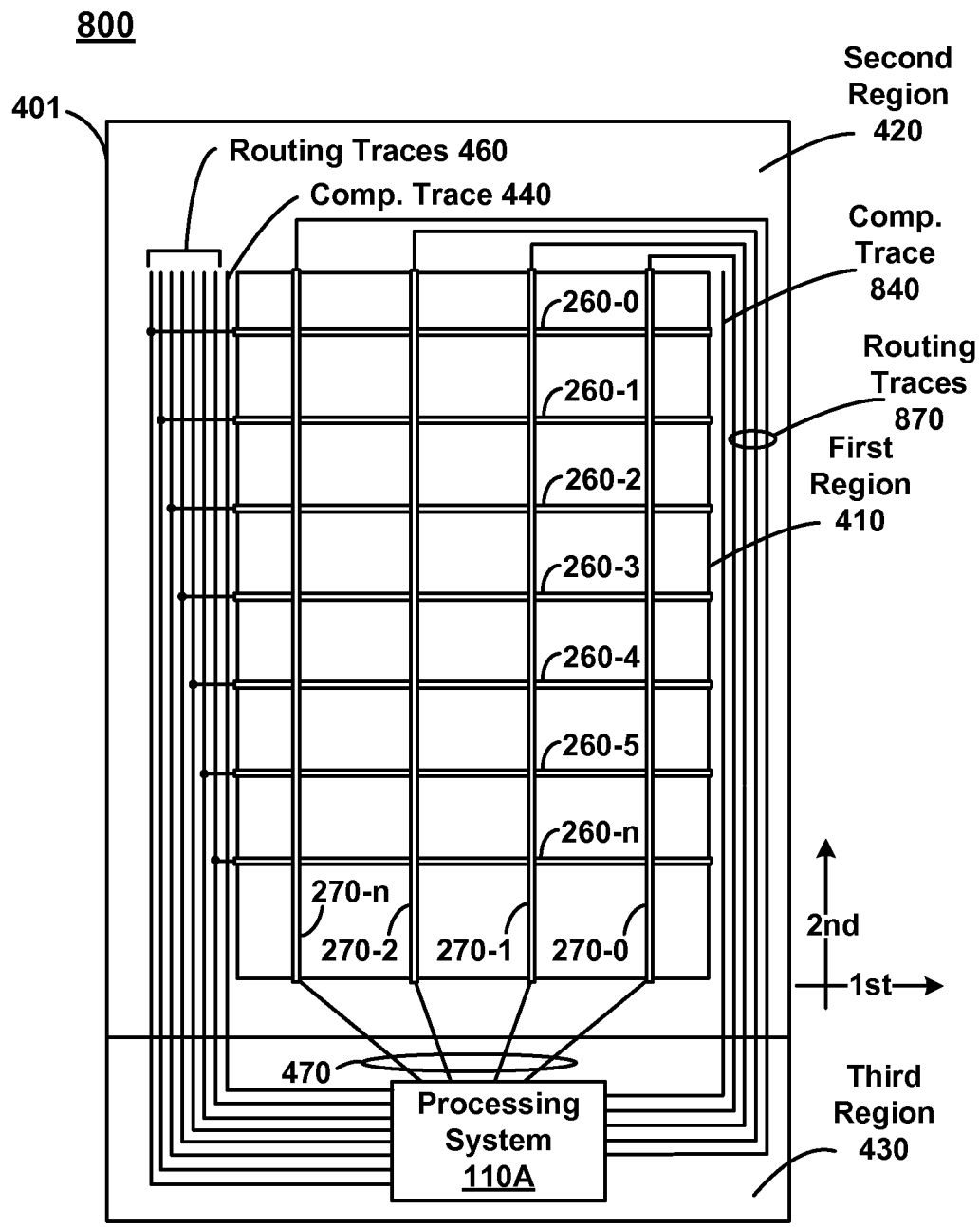
FIG. 8 illustrates a capacitive input device which includes a sensor electrode pattern, routing traces, and a plurality of compensation traces, according to various embodiments.

FIG. 8 illustrates a capacitive input device 800 which includes a sensor electrode pattern, routing traces, and a plurality of compensation traces, according to various embodiments. With reference to FIG. 8, the sensor electrode pattern is similar to sensor electrode pattern 200 of FIG. 2 and includes a first plurality of sensor electrodes 260 disposed parallel to a first direction and a second plurality of sensor electrodes 270 disposed parallel to a second direction. As depicted, the angle between the first and second directions, and consequently between the first plurality of sensor electrodes 260 and the second plurality of sensor electrodes 270, is substantially (e.g., within manufacturing tolerances) orthogonal. It is appreciated, however, other angles between the first and second set of sensor electrodes (260, 270), which are greater than zero degrees and less than 180 degrees, may exist in other embodiments.

In FIG. 8, as in FIGS. 4, 5, 6, and 7, the first and second pluralities of sensor electrodes (260, 270) are disposed in a first region 410 of substrate 401 which is configured to overlap a display screen of capacitive input device 800. First region 410 is depicted as having a rectangular shape which bounds the first region with a top, bottom, left, and right side edges. Substrate 401 also includes a second region 420, and in some embodiments, a third region 430. Second region 420 is a portion of substrate 401 which does not overlap a display screen of capacitive input device 800. Third region 430, when included, is a portion of substrate 401 which a) does not overlap a display screen of capacitive input device 800; and b) provides a bonding region for an ASIC and/or integrated circuits, such as processing system 110A. Third region 430, when included, typically also includes shielding to shield processing system 110A and routing traces which are disposed in the third region. In an embodiment where third region 430 is not included, processing system 110A is not mounted on substrate 401, and is instead mounted elsewhere on another substrate and then electrically coupled with routing and compensation traces depicted in second region 420. In one embodiment, substrate 401 is made of glass.

Routing traces 470 are disposed in second region 420, along a bottom side edge of first region 410, and ohmically couple individual sensor electrodes 270 (270-0 . . . 270-*n*) with processing system 110A.

Routing traces 460 are disposed in second region 420, along a left side edge of first region 410, and ohmically couple individual sensor electrodes 260 (260-0 . . . 260-*n*) of sensor electrodes 260 with processing system 110A.

Routing traces 870 are disposed in second region 420, along the right side edge of first region 410 and portions of the upper side edge of first region 410, and ohmically couple individual sensor electrodes 270 (270-0 . . . 270-*n*) of sensor electrodes 270 with processing system 110A. These coupling are on the opposite ends of sensor electrodes 270 from the couplings provided by routing traces 470, and allow for double routing of sensor electrodes 270.

A compensation trace 440 is disposed in second region 420 and ohmically coupled to processing system 110A. In some embodiments, compensation trace 440 is not ohmically coupled to any sensor electrode. In other embodiments, compensation trace 440 is not ohmically coupled to any sensor electrode that is located in first region 410, but may be ohmically coupled to a sensor electrode that is not located in first region 410. Compensation trace 440 is substantially parallel and proximate to routing traces 460 and has substantially the same overall length (and the same length along the left side edge of first region 410) as the individual routing traces of routing traces 460. In this manner, an inadvertent input object, such as the tip of the finger of a hand gripping capacitive input device 800, should capacitively couple to routing traces 460 and compensation trace 440 in a similar or predictable manner.

In the embodiment depicted in FIG. 8, compensation trace 440 is disposed between the sensor electrodes (260, 270) of first region 410 and routing traces 460. Because of this, each routing trace of routing traces 460 crosses compensation trace 440, without being ohmically coupled to compensation trace 440 (such as by jumpering over), in order to reach and ohmically couple with a sensor electrode 260.

A compensation trace 840 is disposed in second region 420 and ohmically coupled to processing system 110A. In some embodiments, compensation trace 840 is not ohmically coupled to any sensor electrode. In other embodiments, compensation trace 840 is not ohmically coupled to any sensor electrode that is located in first region 410, but may be ohmically coupled to a sensor electrode that is not located in first region 410. Compensation traces 440 and 840 are each disposed proximate to routing traces that are disposed along different side edges of first region 410. For example, compensation trace 840 is substantially parallel and proximate to routing traces 870 along the right side edge of first region 410, and has substantially the same length along the right side edge of first region 410 as the individual routing traces of routing traces 870. In this manner, an inadvertent input object on the right side edge of substrate 401, such as the tip of the finger of a hand gripping capacitive input device 800, should capacitively couple to routing traces 870 and compensation trace 840 in a similar or predictable manner.

In the embodiment depicted in FIG. 8, routing traces 870 are disposed between the sensor electrodes (260, 270) of first region 410 and compensation trace 840. Because of this, routing traces 870 do not cross compensation trace 840 in order to reach and ohmically couple with a sensor electrode 260.

In the embodiment depicted in FIG. 8, compensation trace 840 is disposed between the sensor electrodes (260, 270) of first region 410 and routing traces 870. However compensation trace 840 terminates even with the top right corner of first region 410, while routing traces 870 proceed further upward, and then turn to parallel at least a portion of the top side edge of first region 410. As such, routing traces of routing traces 870 do not cross over compensation trace 840 in order to reach and ohmically couple with a sensor electrode 270.

In the embodiment illustrated in FIG. 8, when in an absolute sensing mode, capacitances measured on compensation trace 440 are employed to compensate for sensitivity to input objects experienced by routing traces 760; while capacitances measured on compensation trace 840 are employed to compensate for sensitivity to input objects experienced by routing traces 870. Such compensation can be performed in the manners previously described herein In one embodiment, sensor electrodes 260 of FIG. 8 are configured to be utilized as transmitter electrodes while sensor electrodes 270 of FIG. 8 are configured to be utilized as receiver electrodes. In particular, the double routing of routing traces to opposing ends of sensor electrodes 260 allows for a shortened settling time when signals are transmitted on these sensor electrodes. Compensation traces 440 and/or 840 may be held at a fixed potential (including ground potential) or maintained at a high impedance when capacitive input device 800 is operated in a transcapacitive sensing mode.

Figure 9:
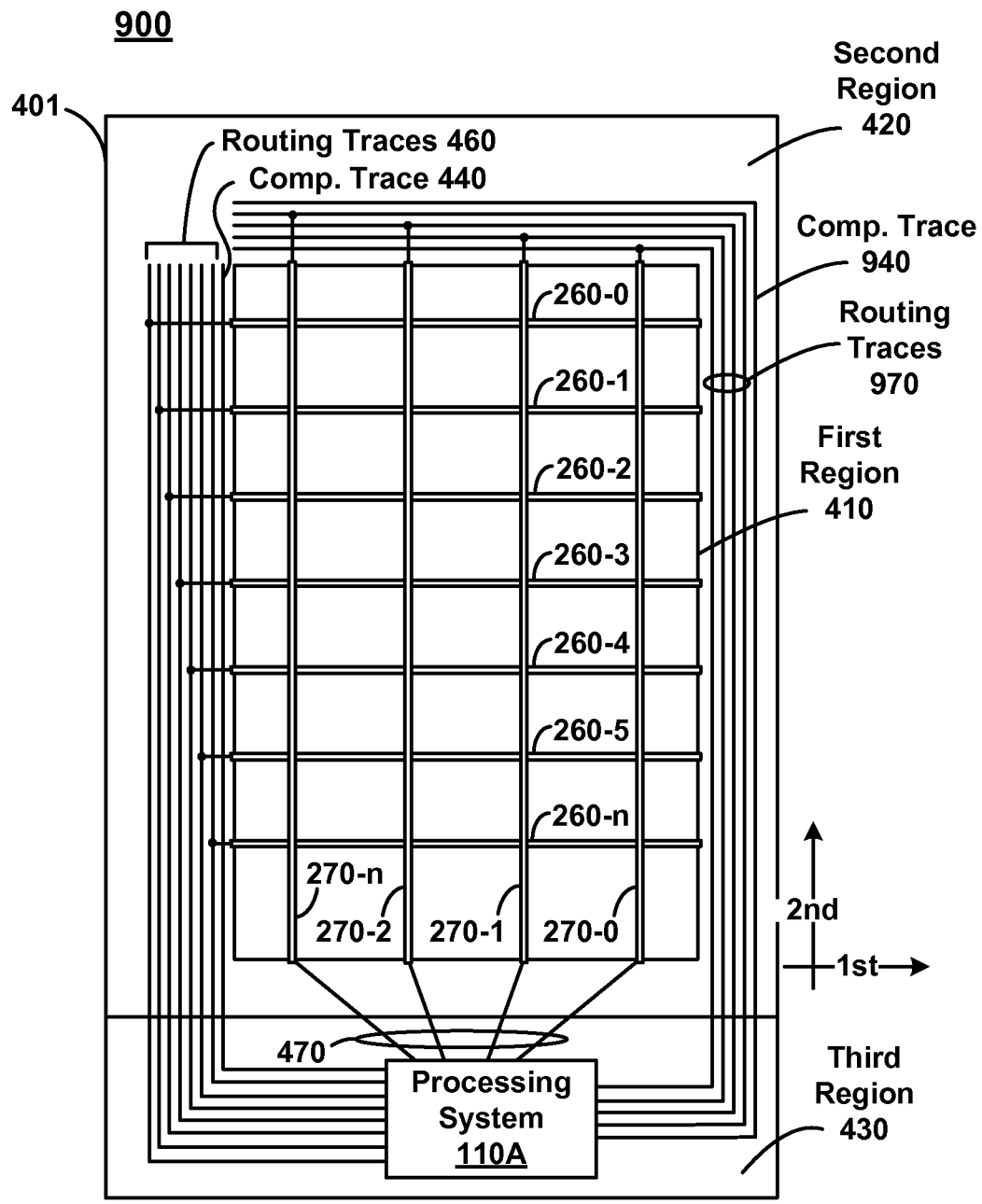
FIG. 9 illustrates a capacitive input device which includes a sensor electrode pattern, routing traces, and a plurality of compensation traces, according to various embodiments.

FIG. 9 illustrates a capacitive input device 900 which includes a sensor electrode pattern, routing traces, and a plurality of compensation traces, according to various embodiments. With reference to FIG. 9, the sensor electrode pattern is similar to sensor electrode pattern 200 of FIG. 2 and includes a first plurality of sensor electrodes 260 disposed parallel to a first direction and a second plurality of sensor electrodes 270 disposed parallel to a second direction. As depicted, the angle between the first and second directions, and consequently between the first plurality of sensor electrodes 260 and the second plurality of sensor electrodes 270, is substantially (e.g., within manufacturing tolerances) orthogonal. It is appreciated, however, other angles between the first and second set of sensor electrodes (260, 270), which are greater than zero degrees and less than 180 degrees, may exist in other embodiments.

In FIG. 9, as in FIGS. 4, 5, 6, 7, and 8, the first and second pluralities of sensor electrodes (260, 270) are disposed in a first region 410 of substrate 401 which is configured to overlap a display screen of capacitive input device 900. First region 410 is depicted as having a rectangular shape which bounds the first region with a top, bottom, left, and right side edges. Substrate 401 also includes a second region 420, and in some embodiments, a third region 430. Second region 420 is a portion of substrate 401 which does not overlap a display screen of capacitive input device 900. Third region 430, when included, is a portion of substrate 401 which a) does not overlap a display screen of capacitive input device 900; and b) provides a bonding region for an ASIC and/or integrated circuits, such as processing system 110A. Third region 430, when included, typically also includes shielding to shield processing system 110A and routing traces which are disposed in the third region. In an embodiment where third region 430 is not included, processing system 110A is not mounted on substrate 401, and is instead mounted elsewhere on another substrate and then electrically coupled with routing and compensation traces depicted in second region 420. In one embodiment, substrate 401 is made of glass.

Routing traces 470 are disposed in second region 420, along a bottom side edge of first region 410, and ohmically couple individual sensor electrodes 270 (270-0 . . . 270-n) with processing system 110A.

Routing traces 460 are disposed in second region 420, along a left side edge of first region 410, and ohmically couple individual sensor electrodes 260 (260-0 . . . 260-n) of sensor electrodes 260 with processing system 110A.

Routing traces 970 are disposed in second region 420, along the right side edge of first region 410 and the upper side edge of first region 410, and ohmically couple individual sensor electrodes 270 (270-0 . . . 270-n) of sensor electrodes 270 with processing system 110A. These coupling are on the opposite ends of sensor electrodes 270 from the couplings provided by routing traces 470, and allow for double routing of sensor electrodes 270.

A compensation trace 440 is disposed in second region 420 and ohmically coupled to processing system 110A. In some embodiments, compensation trace 440 is not ohmically coupled to any sensor electrode. In other embodiments, compensation trace 440 is not ohmically coupled to any sensor electrode that is located in first region 410, but may be ohmically coupled to a sensor electrode that is not located in first region 410. Compensation trace 440 is substantially parallel and proximate to routing traces 460 and has substantially the same overall length (and the same length along the left side edge of first region 410) as the individual routing traces of routing traces 460. In this manner, an inadvertent input object, such as the tip of the finger of a hand gripping capacitive input device 900, should capacitively couple to routing traces 460 and compensation trace 440 in a similar or predictable manner.

In the embodiment depicted in FIG. 9, compensation trace 440 is disposed between the sensor electrodes (260, 270) of first region 410 and routing traces 460. Because of this, each routing trace of routing traces 460 crosses compensation trace 440, without being ohmically coupled to compensation trace 440 (such as by jumpering over), in order to reach and ohmically couple with a sensor electrode 260.

A compensation trace 940 is disposed in second region 420 and ohmically coupled to processing system 110A. In some embodiments, compensation trace 940 is not ohmically coupled to any sensor electrode. In other embodiments, compensation trace 940 is not ohmically coupled to any sensor electrode that is located in first region 410, but may be ohmically coupled to a sensor electrode that is not located in first region 410. Compensation traces 440 and 940 are each disposed proximate to routing traces that are disposed along different side edges of first region 410. For example, compensation trace 940 is substantially parallel and proximate to routing traces 970 along the right side edge and along the top side edge of first region 410, and has substantially the same length along the right side and top side edges of first region 410 as the individual routing traces of routing traces 970. In this manner, an inadvertent input object on the right side edge and/or top side edge of substrate 401, such as the tip of the finger of a hand gripping capacitive input device 900, should capacitively couple to routing traces 970 and compensation trace 940 in a similar or predictable manner.

In the embodiment depicted in FIG. 9, routing traces 970 are disposed between the sensor electrodes (260, 270) of first region 410 and compensation trace 940. Because of this, routing traces 970 do not cross compensation trace 940 in order to reach and ohmically couple with a sensor electrode 260.

In the embodiment illustrated in FIG. 9, when in an absolute sensing mode, capacitances measured on compensation trace 440 are employed to compensate for sensitivity to input objects experienced by routing traces 760; while capacitances measured on compensation trace 940 are employed to compensate for sensitivity to input objects experienced by routing traces 870. Such compensation can be performed in the manners previously described herein.

In one embodiment, sensor electrodes 260 of FIG. 9 are configured to be utilized as transmitter electrodes while sensor electrodes 270 of FIG. 9 are configured to be utilized as receiver electrodes. In particular, the double routing of routing traces to opposing ends of sensor electrodes 260 allows for a shortened settling time when signals are transmitted on these sensor electrodes. Compensation traces 440 and/or 940 may be held at a fixed potential (including ground potential) or maintained at a high impedance when capacitive input device 900 is operated in a transcapacitive sensing mode.

Example Additional Configurations and Uses

It should be appreciated that the examples provided and described in conjunction with FIGS. 4-9 may be combined in various manners. For example, compensation trace 540 (illustrated in FIG. 5) may be utilized in place of or in conjunction with compensation trace 440 (as illustrated in FIGS. 8 and 9) in order to capacitively compensate routing traces 460 in input device 800 or 900. In the same manner, in some embodiments, instead of just a single compensation trace 840 (see FIG. 8) or 940 (see FIG. 9), two compensation traces can be utilized to sandwich and compensate routing traces 870 of input device 800 or routing traces 970 of input device 900.

In some embodiments, compensation traces may further be utilized for purposes of grip detection and/or an as extension of a sensing region, as well as for compensation. With reference to FIG. 4 and compensation trace 440, in some embodiments, when sensor electrodes 260 are utilized in an absolute capacitive sensing mode, compensation trace 440 can be used for compensation in the manner previously described; when no sensing is being conducted with sensor electrodes 260 or 270 compensation trace 440 can be used in an absolute capacitive sensing mode to sense for gripping digits of a user. Recognition of the presence of gripping digits, may be used in a variety of manners, such as to trigger wake-ups within an electronic device of which input device 400 is a portion. With continued reference to FIG. 4 and compensation trace 440, in some embodiments, when sensor electrodes 260 are utilized in an absolute capacitive sensing mode, compensation trace 440 can be used for compensation in the manner previously described; when sensor electrodes 270 are then used in an absolute sensing mode compensation trace 440 can be used in an absolute sensing mode to sense for intentional inputs which may be slightly outside of first region 410.

Example Methods of Operation

FIG. 10 illustrates a flow diagram 1000 of procedures in an example method of operating a capacitive input device, according to various embodiments. Procedures of this method will be described with reference to elements and/or components of one or more of FIGS. 1-9. It is appreciated that in some embodiments, the procedures may be performed in a different order than described, that some of the described procedures may not be performed, and/or that one or more additional procedures to those described may be performed.

At procedure 1010 of flow diagram 1000, in one embodiment, when performing transcapacitive sensing with a capacitive input device that includes a compensation trace and a plurality of sensor electrodes disposed on a first region of a substrate which overlaps a display screen, a voltage is driven on the compensation trace. For example, in one embodiment, a compensation trace (e.g., 440, 540, 640, 740, 840, and/or 940) of a capacitive input device (e.g., 100, 400, 500, 600, 700, 800, 900, or the like) is driven to ground potential and can be utilized as a virtual ground, which functions primarily as a shield while a capacitive input device is operating in transcapacitive sensing mode. In other embodiments, the compensation trace may be driven such that it is held at another potential other than ground potential. In one embodiment, sensor circuitry 310 of processing system 110A drives the voltage on the compensation trace. First region 410, illustrated in FIGS. 4-9, is an example of a first region of a substrate (e.g., substrate 400) which overlaps a display screen. In one embodiment, sensor circuitry 310 of processing system 110A is used to perform this transcapacitive sensing.

At procedure 1020 of flow diagram 1000, in one embodiment, the capacitive input device (e.g., 100, 400, 500, 600, 700, 800, 900, or the like) is used to perform absolute capacitive sensing with its sensor electrodes (e.g., sensor electrodes 260 and 270 illustrated in FIGS. 2 and 4-9). In one embodiment, sensor circuitry 310 of processing system 110A is used to perform this absolute sensing.

At procedure 1022 of flow diagram 1000, in one embodiment while operating in the absolute sensing mode, signals are received on a compensation trace and are used to measure a capacitance related to an input object in a second region of substrate, where the second region does not overlap a display screen. Second region 420, illustrated in FIGS. 4-9, is an example of a second region of a substrate (e.g., substrate 400) which does not overlap a display screen.

At procedure 1024 of flow diagram 1000, in one embodiment while operating in the absolute sensing mode, the signals received from the compensating trace(s) are utilized to compensate for sensitivity of one or more routing traces to said input object in the second region. The measured capacitance from the compensation trace can be utilized in various manners to compensate for sensitivity of one or more routing traces. With reference to FIG. 4, for example, the capacitance measured from compensation trace 440 may be subtracted or scaled and then subtracted from one or more of the capacitances measured by one or more sensor electrodes coupled with routing traces 460 which are parallel and proximate to compensation trace 440. In some embodiments, the scaling may be the same for each of routing traces 460, while in other embodiments, a different scaling factor may be applied to a capacitance measured from compensation trace 440 before the scaled capacitance is subtracted from a capacitance measured by a sensor electrode coupled with a particular routing traces 460.

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed.

What is claimed is:

1. A method of operating a capacitive input device, wherein said capacitive input device comprises:
   first and second pluralities of sensor electrodes disposed in a first region of a substrate, wherein said first region is configured to overlap a display screen;
   at least one routing trace disposed in a second region of said substrate and ohmically coupled to a sensor electrode of one of said first and second pluralities of sensor electrodes and also to a processing system, wherein said second region comprises a non-display screen overlapping portion of said substrate; and
   a compensation trace disposed in said second region of said substrate and ohmically coupled to said processing system, said compensation trace being substantially parallel and proximate to said at least one routing trace and having substantially the same length along a side edge of said first region as said at least one routing trace, wherein said compensation trace is not ohmically coupled to any sensor electrode located in said first region; and
   said method comprising:
   when performing transcapacitive sensing with said capacitive input device, driving a voltage on said compensation trace; and
   when performing absolute capacitive sensing with said capacitive input device:
   receiving signals on said compensation trace to measure a capacitance related to an input object in said second region; and
   utilizing said received signals to compensate for sensitivity of said at least one routing trace to said input object in said second region.

2. The method as recited in claim 1, wherein said driving a voltage on said compensation trace comprises:

driving a substantially constant voltage on said compensation trace such that said compensation trace acts as a shield.

3. The method as recited in claim 1, wherein said driving a voltage on said compensation trace comprises:
driving a substantially constant voltage on said compensation trace such that said compensation trace is maintained at a virtual ground potential.

4. The method as recited in claim 1, wherein said utilizing said received signals to compensate for sensitivity of said at least one routing trace to said input object in said second region comprises:
subtracting said measured capacitance from a capacitance measured on said at least one routing trace.

5. The method as recited in claim 1, wherein said utilizing said received signals to compensate for sensitivity of said at least one routing trace to said input object in said second region comprises:
subtracting said measured capacitance from each of a plurality routing traces that are proximate to and parallel with said compensation trace.

6. The method as recited in claim 1, wherein said utilizing said received signals to compensate for sensitivity of said at least one routing trace to said input object in said second region comprises:
subtracting a scaled amount of said measured capacitance from a capacitance measured on said at least one routing trace, wherein said scaled amount is based upon a relationship between a surface area of said at least one routing trace as compared to a surface area of said compensation trace.

7. The method as recited in claim 1, wherein said utilizing said received signals to compensate for sensitivity of said at least one routing trace to said input object in said second region comprises:
subtracting a scaled amount of said measured capacitance from a capacitance measured on said at least one routing trace, wherein said scaled amount is based on a distance between said compensation trace and said at least one routing trace.

8. A processing system for a capacitive input device, wherein said capacitive input device comprises:
first and second pluralities of sensor electrodes disposed in a first region of a substrate, wherein said first region is configured to overlap a display screen;
at least one routing trace disposed in a second region of said substrate and ohmically coupled to a sensor electrode of one of said first and second pluralities of sensor electrodes and also to a processing system, wherein said second region comprises a non-display screen overlapping portion of said substrate; and
a compensation trace disposed in said second region of said substrate and ohmically coupled to said processing system, said compensation trace being substantially parallel and proximate to said at least one routing trace and having substantially the same length along a side edge of said first region as said at least one routing trace, wherein said compensation trace is not ohmically coupled to any sensor electrode; and
said processing system comprising:

sensor circuitry configured to drive a voltage on said compensation trace when performing transcapacitive sensing with said first and second pluralities of sensor electrodes;
said sensor circuitry configured to receive signals on said compensation trace to measure a capacitance related to an input object in said second region when performing absolute capacitive sensing with said first and second pluralities of electrodes; and
computation circuitry configured to utilize said received signals to compensate for sensitivity of said at least one routing trace to said input object in said second region.

9. The processing system of claim 8, wherein said voltage on said compensation trace comprises:
a substantially constant voltage on said compensation trace such that said compensation trace acts as a shield.

10. The processing system of claim 8, wherein said voltage on said compensation trace comprises:
a substantially constant voltage on said compensation trace such that said compensation trace is maintained at a virtual ground potential.

11. The processing system of claim 8, wherein said computation circuitry configured to utilize said received signals to compensate for sensitivity of said at least one routing trace to said input object in said second region comprises:
said computation circuitry being configured to subtract said measured capacitance from a capacitance measured on said at least one routing trace.

12. The processing system of claim 8, wherein said computation circuitry configured to utilize said received signals to compensate for sensitivity of said at least one routing trace to said input object in said second region comprises:
said computation circuitry being configured to subtract said measured capacitance from each of a plurality routing traces that are proximate to and parallel with said compensation trace.

13. The processing system of claim 8, wherein said computation circuitry configured to utilize said received signals to compensate for sensitivity of said at least one routing trace to said input object in said second region comprises:
said computation circuitry being configured to subtract a scaled amount of said measured capacitance from a capacitance measured on said at least one routing trace, wherein said scaled amount is based upon a relationship of a surface area of said at least one routing trace as compared to a surface area of said compensation trace.

14. The processing system of claim 8, wherein said computation circuitry configured to utilize said received signals to compensate for sensitivity of said at least one routing trace to said input object in said second region comprises:
said computation circuitry being configured to subtract a scaled amount of said measured capacitance from a capacitance measured on said at least one routing trace, wherein said scaled amount is based on a distance between said compensation trace and said at least one routing trace.

* * * * *